Sept. 2, 1969    F. J. ARMSTRONG ET AL    3,465,184
FLUID COOLED ELECTRIC MOTOR HAVING A SPEED INDICATING ARRANGEMENT
Filed April 27, 1967    2 Sheets-Sheet 1
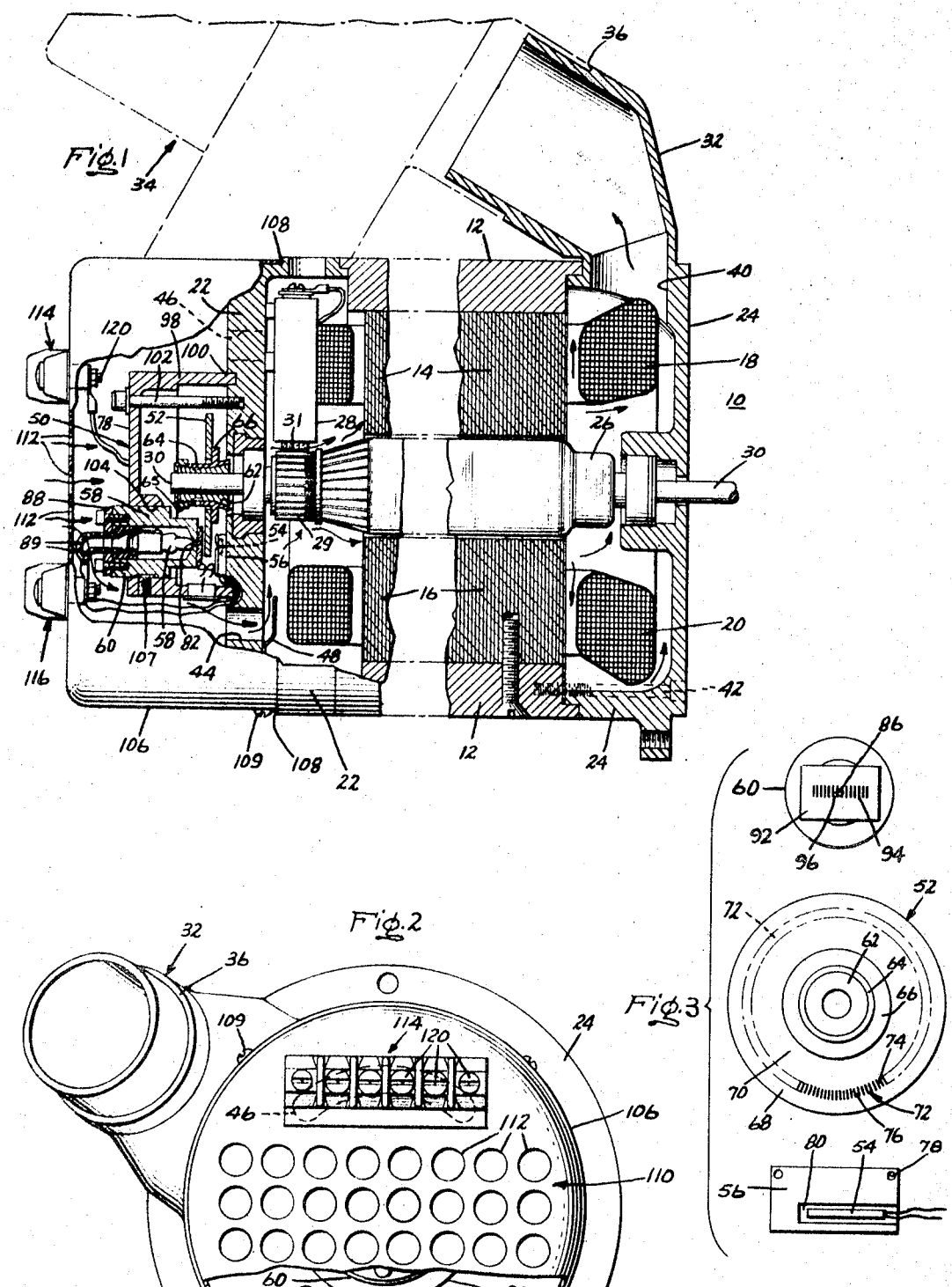
Inventors:
Fredrick J. Armstrong,
Robert A. Susdorf
by
Q. Sidney Alpert
Attorney.

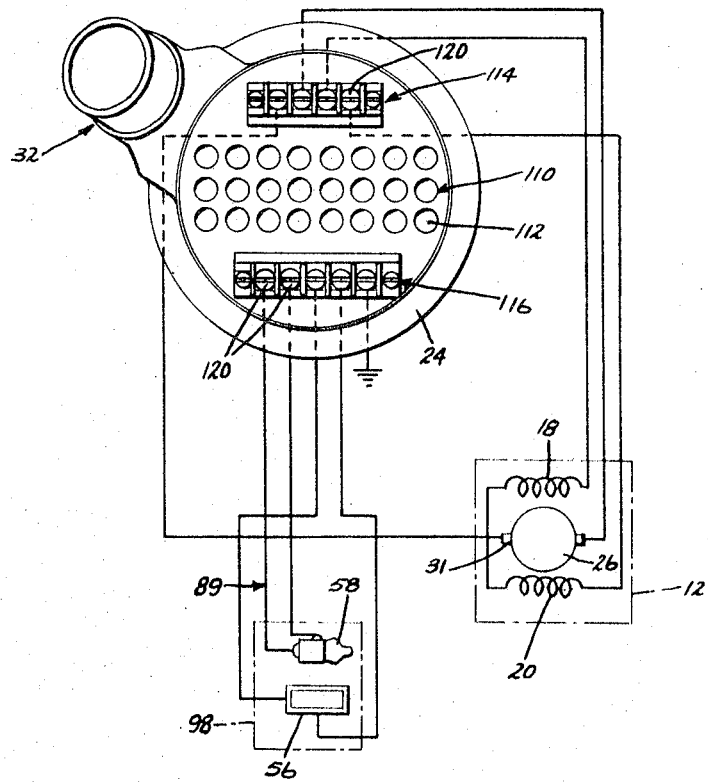
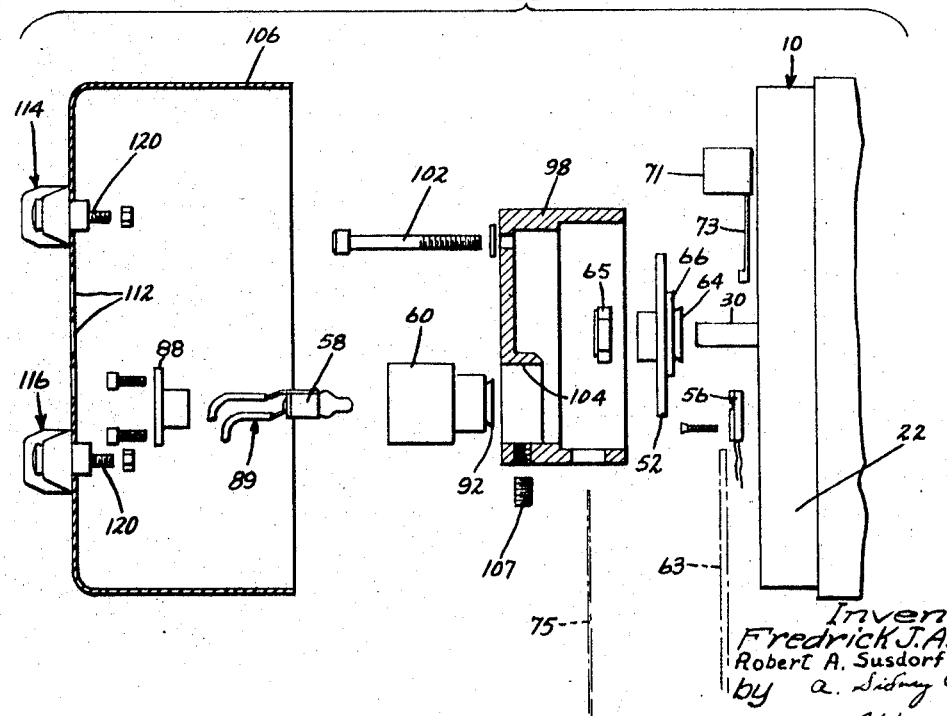

United States Patent Office 3,465,184
Patented Sept. 2, 1969

3,465,184
FLUID COOLED ELECTRIC MOTOR HAVING A SPEED INDICATING ARRANGEMENT
Fredrick J. Armstrong and Robert A. Susdorf, Fort Wayne, Ind., assignors to General Electric Company, a corporation of New York
Filed Apr. 27, 1967, Ser. No. 634,183
Int. Cl. H02k 9/02
U.S. Cl. 310—66                                 5 Claims

ABSTRACT OF THE DISCLOSURE

An electric motor having a speed indicating assembly for permitting the speed of the armature to be accurately controlled, and cooling means for transferring heat away from the motor components, including the speed indicating assembly. The speed indicating assembly includes among other parts an optical disc, light source and photocell for producing an output signal proportional to the rotational speed of the armature. The cooling means includes an airflow path through the motor, vents in one end shield and deflectors for directing air between the commutator and the speed indicating assembly, and a hollow tubular projection on the other end shield communicating with the airflow path and including a seat for a forcing or exhaust fan.

Background of the invention

This invention relates generally to dynamoelectric machines, such as electric motors, and more specifically to air cooled electric motors having armature assemblies and armature speed indicating means incorporated therein.

Since the adevnt of computer equipment, there has been a demand for special purpose dynamoelectric machines in the form of electric motors for use with this equipment. In one application these motors are needed for driving capstans in order to transport programmed tape in the computers themselves, and in other applications in certain peripheral equipment, such as high speed printers, disc packs and the like. One common requirement for electric motors used in these applications is that the motor accelerate rapidly and that the running speed be substantially constant. Thus, at the present time, for example, motors used for driving capstans normally should come up to running speed in not more than five milliseconds and preferably less and the running speed should ordinarily not vary more than 1 to 2 percent, since it is extremely important that the programmed tape be moved past the tape reader or head at nearly constant speed.

One such special purpose electric motor capable of use, among other applications, in computer equipment is disclosed in our co-pending U.S. patent application Ser. No. 634,182 filed Apr. 27, 1967 which is assigned to the same assignee. As will be seen in detail in that application, the illustrated machine is a direct current type electric motor having a wound field and a low inertia armature assembly having a commutator and windings carried on the periphery of a magnetic core. This motor has been found to be quite acceptable both as to performance and quality in various computer equipment applications. It would be additionally desirable, however, to provide motors for such applications with a construction for fluid cooling the motor components, such as the wound field and commutation parts. Furthermore, it would be highly advantageous to furnish an inexpensive yet effective arrangement for indicating the rotational speed of the armature assembly to enable the speed of the motor to be precisely controlled for certain applications.

Accordingly, it is a primary object of this invention to provide an improved fluid cooled electric motor of the type having a low inertia armature assembly and speed indicating means enabling the speed of the armature assembly to be precisely controlled.

It is another objetc of this invention to provide an improved electric motor which may be readily furnished with relatively inexpensive yet extremely efficient air cooling and speed indicating means.

In accordance with our invention, in one form thereof, we provide an electric motor having a motor frame including a housing, a field winding, first and second end frames or shields and a low inertia armature assembly rotatably carried between the end shields, with the armature shaft extending through the end shields. A speed indicating assembly is provided, including an optical disc mounted on an extension of the shaft exteriorly of the motor housing, a light sensing device or photo-cell mounted on a first end shield generally adjacent one side of the disc, and a cover enclosing the disc and photo-cell and having a light source which is located generally adjacent the other side of the disc.

In accordance with a further aspect of this invention, we provide in one form, an airflow path through the motor housing and at least one vent in the first end shield with a deflector for directing air radially inwardly upon the commutator. The second end shield has a tubular projection for directing a forced air or cooling fluid flow through the motor and into heat transferring contact with the motor components thereby cooling the field coils and the commutator of the motor. In addition, an enclosure member is mounted on the first end shield enclosing the air vent and the speed indicating assembly, with a portion of the enclosure member being perforated to allow air to pass between the enclosure and the surrounding atmosphere. The enclosure member also includes at least one terminal board including terminal sections positioned close to or in proximity with the speed indicating assembly, to which the field coils, commutator brushes and photo-cell are all electrically connected in order to facilitate the making of external electrical connections thereto.

Among other advantages, the speed indicating assembly of the exemplified motor provides an extremely accurate output signal, the frequency of which is proportional to the speed of rotation of the armature shaft, thereby enabling the speed of rotation to be precisely controlled. In actual practice, the photo-cell is electrically connected to an amplifier and comparator circuit and the output signal of the photo-cell, which is indicative of the rotational speed of the armature shaft, is compared to a reference signal. The motor may then be energized or deenergized in order to maintain the rotational speed of the armature assembly substantially constant (for instance, within 1 to 2 percent for one application). Since any inaccuracies in the mechanical mounting or positioning of the various speed indicating components will be greatly magnified in the amplifier and comparator circuit, it is extremely important to minimize or even eliminate such inaccuracies during fabrication and assembly of the present motor. The exemplified method of assembly, together with the preferred motor components, enable such adjustments to be made for insuring the production of a high quality, accurately constructed motor, the speed of which may be precisely controlled.

Another advantage of the present invention is in the air cooling system, which enables a sufficient volume of air to be forced through the motor in order to cool not only the field windings, but also to cool the armature assembly. In addition, the exemplified air cooling system keeps dust and metallic particles away from the critical operating parts of the motor, i.e., the speed indicating assembly and the commutator.

The subject matter which we regard as our invention is set forth in the appended claims, the invention itself, however, together with further objects and advantages thereof may be better understood by referring to the following description taken in conjunction with the accompanying drawings.

Brief description of the drawings

FIGURE 1 is an elevational view of the electric motor incorporating the preferred form of this invention, with parts broken away and parts in section illustrating the improved air cooling and speed indicating assembly features of this invention;

FIGURE 2 is an end elevational view, with parts broken away in order to further illustrate the air cooling arrangement of the motor shown in FIGURE 1;

FIGURE 3 is an elevational view of several components included in the speed indicating assembly illustrated in the motor of FIGURES 1 and 2;

FIGURE 4 is a schematic circuit diagram showing the connections of various motor components to the terminal boards illustrated in FIGURES 1 and 2; and FIGURE 5 is an exploded view of a portion of the motor shown in FIGURES 1 and 2 illustrating the preferred method of assembling the motor.

Description of the preferred embodiments

Referring now to the drawings in greater detail, and particularly to FIGURES 1 and 2, we have illustrated an exemplified dynamoelectric machine in the form of a direct current electric motor 10 including a housing 12, a would field or stator including, in the exemplification, first and second magnetic poles 14 and 16 carrying wound field coils 18 and 20 respectively. Although in the exemplification we have shown a two-pole electric motor, it will be appreciated that the present invention may readily be incorporated in electric motors having more than two poles, in alternating current type motors, or in motors having a wound or permanent magnet field if so desired such as that disclosed in our co-pending application.

The motor 10 in the illustrated exemplification additionally includes first and second end frames or shields 22 and 24 having conventional ball bearings located therein for rotatably mounting an armature assembly 26 therebetween. The armature assembly 26 includes a commutator 28 at one end, and an armature shaft 30 which extends through the end shields 22 and 24 and exteriorly of the motor housing 12. For purposes of disclosure the illustrated armature assembly shown herein is more fully described in greater detail and claimed in the aforementioned co-pending application of which we are co-inventors. The motor 10 also includes a pair of brush holders 29 (only one of which is illustrated) integrally molded, in this case, on the end shield 22 and carrying the usual brushes 31.

In accordance with one aspect of our invention, the end shield 24 includes an integrally formed hollow tubular projection 32 adapted to receive either an air exhaust or an air forcing fan arrangement. In actual practice, we have utilized an air exhaust fan 34 which is mounted upon a reduced portion or seat 36 at the end of the tubular projection 32 in substantially air-tight relationship therewith for drawing cooling fluid such as air through the motor 10. In order to facilitate the drawing of air through the motor for cooling purposes, the tubular projection 32 opens to an airflow path through the motor 10, partially formed by a channel 40 in the end shield 24 and including the open space in the motor housing between the poles 14 and 16 and between the housing wall and the armature. As will be seen in FIGURE 1 in particular, the end shield 24 is mounted to the motor housing 12 by an overlapping connection, and is normally fastened to the housing 12 by suitable mounting means such as mounting bolts 42 or the like.

In order to complete the airflow path through the motor, the other end shield 22 is provided with a pair of air vents or openings 44 and 46 therethrough, the air vents being located on opposite sides of and generally equally spaced from the radial center of the end shield 22. In addition, curved air deflectors 48 (only one of which is shown) are located on the inner side of the end shield 22 adjacent to the air vents 44 and 46 for directing or guiding the flow of air through the air vents radially inwardly onto the commutator 28, brushes 31, and the peripheral surface of the armature assembly in order to cool these parts. The air which is drawn into the airflow path also comes into heat transfer contact with the stator, the motor housing 12 and the end shield 24 to effect reduction in temperature of these parts, especially the heat generating coils of the stator. In addition, any dust or metallic particles which may be accumulated at the commutator end of the motor will be drawn away from end shield 22 through the motor toward end shield 24 where accumulations of dust and metallic particles will not interfere with proper motor operation.

Referring now to another aspect of the present invention, with reference again to FIGURES 1 and 2, we have provided an armature speed indicating means in the form of a speed indicating assembly generally denoted by reference numeral 50. The speed indicating assembly 50 includes an optical disc 52, a photo-cell 54 contained in a mounting block 56 and a light source 58 contained in a holder 60, each of which may be seen in greater detail in FIGURE 3. The optical disc 52 is mounted on the armature shaft 30 by an arrangement which includes an expandable collet 62 and a collar 64 which upon being tightened down on the collet 62 will secure the collar and collet to the shaft 30. In addition, the collar includes an annular flange 66 to which the disc 52 is fastened by any suitable fastening means; e.g., a thermosetting epoxy resin or the like.

The optical disc 52 shown in detail in FIGURE 3 comprises an annular glass disc having outer and inner opaque portions 68 and 70 defining an annular track 72 therebetween. The track includes a plurality of alternate opaque sections 74 and light transmitting sections or windows 76 therebetween, the opaque sections 74 normally being etched upon the glass by a well-known photographic etching process. In actual practice, the track includes two thousand opaque sections 74 and therefore also two thousand light transmitting sections or windows 76.

Still referring to FIGURE 3, the photo-cell mounting block 56 may be seen in greater detail. The mounting block 56 in the exemplification was fabricated from a clear thermoplastic polyamide resin, but of course may also be fabricated from other suitable plastic or metallic materials. The mounting block includes several screw receiving holes 78 therein in order to enable it to be mounted on the outer face of the end shield 22 and an elongated groove 80 for receiving the photo-cell 54. The photo-cell 54 is normally placed in the groove and a suitable thermosetting epoxy resin applied thereto in order to permanently mount the photo-cell in the groove and to secure the lead connections.

Also shown in FIGURE 3 is the light bulb or source holder 60 which in the exemplification is a generally tubular member having an opening 82 in the forward end thereof, and having a small light bulb 58 suitably fastened therein. In practice, a 0.875 watt light bulb having a relatively thin, straight filament 86 was used, and was fastened in the holder by a mounting plate 88 attached to the rear open end of the holder. The light bulb leads 89 extend through small, substantially airtight openings in the plate 88. Mounted on the forward end of the holder, and covering the opening 82 is a grid plate 92, having a plurality of opaque sections 94 and light transmitting sections or windows 96 having the same dimensions as the opaque sections 74 and windows 76 in the track 72, and otherwise identical thereto.

In order to mount the holder 60 and the light bulb 58 contained therein adjacent the optical disc 52, and further to provide a substantially air-tight enclosure about the speed indicating assembly components to prevent the possibility of dust or other particles gathering on these components, a cover member 98 is mounted on the end shield in a rabbet or groove 100 provided especially for this purpose. The holder 60 is mounted in an opening 104 in the end of the cover member 98, and a set screw 107 is provided for adjusting the position of the holder. The cover member 98, as will be seen in FIGURES 1 and 2, is generally round to match the annular rabbet 100 and accurately dimensioned to tightly fit in this rabbet. In addition, mounting bolts 102 are provided to attach the cover member to the end shield 22. Thus, it will be appreciated that the modifications to the end shield 22 which are necessary in order to mount the speed indicating assembly thereon, as well as furnishing a satisfactory airflow path therethrough are relatively minor, involving only the machining of the rabbet 100, and the drilling of mounting holes for the cover mounting bolts 102 and the screw holes for the mounting block 56, and the provision of the air vents 44, 46 previously mentioned.

In order to enable external electrical connections to be readily made to the speed indicating assembly components and to the other motor components, and in order to provide additional protection for the speed indicating assembly 50, an enclosure member 106 is mounted on the end shield 22. The enclosure member 106 is located on a reduced end portion or seat 108 provided on the end shield 22, with the enclosure 106 conforming to the shape of the seat 108, which in this case is generally round. Thus, as will be seen in FIGURES 1 and 2, the enclosure member 106 encompasses or encloses the cover member 98 and the air vents 44 and 46, and is mounted on the seat 108 by mounting screws 109. In order to allow air to flow into the air vents 44 and 46, the enclosure member 106 includes a perforated section 110, having a plurality of air transmitting holes 112.

Two terminal boards 114 and 116 are mounted on the enclosure member 106 with a plurality of electrical mounting posts 120 having internal terminal sections extending into the interior of the enclosure member toward end shield 22. The various electrical components of the exemplified motor 10, such as the light bulb 58, the photocell 54, the brushes 31 and the field coils 18 and 20 are electrically connected to these internal terminal sections. It will be appreciated that external connections to the various motor and speed indicating assembly components may readily be made by means of external terminal sections of the boards 114, 116 which are exposed outwardly of enclosure member 106 and are quite accessible. Thus, the making of both internal and external electrical connections is greatly facilitated by this arrangement, especially since the terminal boards 114 and 116 have their mounting posts disposed in close proximity to the speed indicating assembly components as well as to other motor components. The connections of the various motor electrical and speed indicating assembly components to the terminal boards 114 and 116 may be better appreciated by referring to FIGURE 4, wherein we have shown these circuit connections in schematic form.

Referring now to FIGURE 5, we will explain the preferred method of assembling the motor 10 including the components of the speed indicating assembly 50. It will be appreciated, of course, that even slight inaccuracies in the mechanical mounting or positioning of the various speed indicating components will be greatly magnified when the electrical output of the photo-cell 54 is fed to a speed controlling circuit (not illustrated). The usual speed controlling circuit generally consists of a comparator circuit wherein a fixed or reference signal is compared to the output signal from the photo-cell 54 and the armature rotational speed adjusted accordingly. Thus, it will be appreciated that errors in the photo-cell output signal which may be engendered by eccentricities in the track 72 or excess axial movement or wobble of the optical disc 52 will affect the photo-cell output signal and preclude accurate control of the armature speed.

In order to eliminate such inaccuracies, the motor 10 is assembled in the following manner. Initially, the end shields 22 and 24 are mounted on the motor housing 12 while separately the optical disc 52 is mounted on the annular flange 66 of the mounting collar 64. The armature shaft 30 is located between the bearings carried in the end shields 22 and 24, with the ends of the shaft extending beyond the end shields exteriorly of the housing. The photo-cell 54 is mounted in the groove 80 in the mounting block 56, and the mounting block 56 is attached or mounted on the outer face of the end shield 22 by suitable mounting means such as machine screws or the like. The mounting collar 64 with the optical disc 52 mounted thereon is then assembled with the expandable collet 62 and the assembly slipped onto the end of the shaft 30. A shim 63 is placed between the photo-cell mounting block 56 and the disc 52 in order to maintain a preselected spacing therebetween, which in practice is approximately 0.015 inch, for one application, a lock nut 65 is tightened down in order to affix the collet and collar to the shaft, and the shim is then removed.

At this time, the armature shaft 30 is rotated and, of course, the disc 52 rotates therewith. While rotating, the track is optically tested for eccentricity with respect to the center line of rotation of the shaft 30 and the disc 52. This optical test is carried out in actual practice by means of a microscope (not illustrated) having an aligning grid mounted on the eyepiece to enable small variations of movement of the track to be identified. No greater than 0.002 inch (or 2 mils) essentricity of the track 72 can be tolerated. Stated otherwise, the distance between the outer line of the track and the center of rotation of the disc may not vary more than 2 mils during one revolution of the disc, since this may introduce undesirable errors in the signal output of the photo-cell 54. Thus, it has been found that in any given 90 degree rotation of the disc 52, either more or less than one quarter of the windows 76 (500 in the exemplification) will pass the photo-cell 54 when eccentricity of the track exists. Under such conditions, the photo-cell 54 will produce spurious output signals, and the speed control circuit will not be as accurate in its control of the speed of revolution of the armature.

Also at this time, the optical disc 52 is tested by means of a test device 71 for excessive axial movement during rotation. The test device 71 includes an arm 73 which is placed in contact with the disc 52 as the disc is rotated with the shaft 30. The arm 73 is connected to a piezzo-electrical crystal (or a mechanical indicator, if desired) for converting mechanical movement to an electrical output, and hene the arm will pick up and the crystal will amplify any axial movement of the disc 52 during rotation. In practice, the maximum allowable axial movement of the disc 52 at the track 72 is 0.001 inch during one revolution of the disc. Excessive axial movement of the disc 52 will cause the level of illumination upon the photo-cell 54 to vary, which in turn will result in an improperly varying output signal from the photo-cell 54. Any mounting errors which are found at this time are, of course, corrected.

After the mounting of the disc 52 has been checked and corrected if needed, the cover member 98 is mounted in the machined rabbet 100 in the face of the end shield 22. The light bulb holder 60, which previously had the grid plate 92 mounted over the opening 82 in the front end thereof, is positioned in the opening 104 in the cover member 98. A removable plug 99 in the side of the cover member 98 is removed and a shim 75 is used to obtain between four to five mils (0.004 to 0.005 inch) distance between the grid plate 92 and the disc 52. At this time the grid windows 96 and the disc windows 76 are aligned. When the proper alignment and spacing between the disc 52 and the grid plate 82 is achieved, the set screw 107 is tightened down in order to affix the holder in place in the cover member 98. The light bulb 84 is then mounted in the holder 60, with the filament thereof 86 aligned with the windows 96 in the grid plate, and the plate 88 attached to the holder 60 thereby completing the assembly of the speed indicating assembly 50, and providing a substantially dust free environment therefor during operation of the motor 10.

With the cover member 98 in place, the electrical leads from the various electrical components of the motor 10 are connected to their associated posts 120 at a common location inside the enclosure member 106 as shown in FIGURE 4. After these electrical connections have been made, the enclosure member 106 is mounted on the end shield 22 thereby completing the assembly of the motor 10.

From the foregoing description of the exemplified electric motor and method of its assembly, an improved air cooling or ventilating arrangement is provided for effectively and efficiently cooling the internal heat generating and transferring motor components, including the normally difficult to cool field windings and commutation parts. Further, an improved mounting arrangement for the speed indicating assembly 50 is provided, wherein the output of the assembly 50 is very accurate while being substantially protected from dust and metallic particles. The air cooling arrangements assists in insuring such dust and metallic particle protection by drawing in an efficient manner any particles away from assembly 50.

It should be apparent to those skilled in the art, while we have shown and described what at present is considered to be the preferred embodiment of my invention in accordance with the patent statutes, it is to be understood that modifications can be made without actually departing from the true spirit and scope of this invention and we therefore intend to cover in the following claims all such equivalent variations as fall within the invention.

What we claim as new and desire to secure by Letters Patent of the United States is:

1. An electric motor having a field and an armature assembly including a shaft and commutation means including a commutator mounted on the shaft; a motor frame having a housing and an end shield mounted at one end of the housing for rotatably supporting a part of the shaft; a speed indicating assembly associated with the shaft for producing a signal proportional to the rotational speed of the shaft, said speed indicating assembly including an optical disc mounted on said shaft adjacent an end thereof for rotation therewith, cover means mounted on said end shield externally of said motor housing for enclosing the end of said shaft, a light source carried by said cover means adjacent to said disc, and light responsive means mounted on said end shield generally adjacent to said disc for producing a signal in response to light energy received from said light source through said rotating disc thereby providing an indication providing an indication of the speed of rotation of said shaft.

2. The electric motor of claim 1 including enclosure means mounted upon said end shield for enclosing said cover means, said enclosure means carrying at least one terminal board having first terminal sections extending into the enclosure means for electrical connection at a common location with at least commutation means and light responsive means; said at least one erminal board having second terminal sections exposed beyond said enclosure means and accessible for connecting the motor to a source of power.

3. The electric motor of claim 2 wherein said enclosure means includes a perforated section to permit the flow of cooling fluid into the enclosure means, said end shield includes at least one vent having flow directing means associated therewith for directing the cooling fluid into contact with said commutation means, and guide means disposed at the end of the motor remote from the commutator for transferring the cooling fluid away from the motor whereby the motor is effectively cooled and the tendency of dust particles to accumulate at the commutator end of the motor is reduced.

4. An electric motor having a field and an armature assembly including a shaft and commutation means having a commutator mounted on the shaft; a motor housing having first and second end shields including bearing means for supporting the shaft; a speed indicating assembly carried by said first end shield externally of said housing, said armature speed indicating assembly including cover means mounted on said first end shield for enclosing an end of said shaft which projects through said first end shield, an optical disc having alternate opaque and light transmitting sections mounted on the armature shaft adjacent to end thereof for rotation with said shaft, a light source mounted on said cover means and located generally adjacent one side of said optical disc, and light responsive means mounted on said first end shield generally adjacent the other side of said optical disc for producing a signal in response to light energy; the electric motor having an airflow path through the motor housing; said first end shield having at least one vent therethrough and airflow directing means for directing means for directing air between said commutation means and a first location in the vicinity of said armature speed indicating assembly, and said second end shield including means in communication with the airflow path for guiding air between the airflow path and a second location externally of the motor at the end of the motor remote from the commutation means whereby the efficient passage of air for cooling purposes through the motor is effected between the first and second locations.

5. The electric motor of claim 4 including enclosure means mounted on said first end shield for enclosing said cover means and said at least one air vent in the vicinity of the first location, said enclosure means including a perforated section to permit airflow therethrough and at least one terminal board having internally exposed terminal sections disposed within said enclosure means; and at least said commutation means and said light responsive means being electrically connected to the internally exposed terminal sections of said terminal board for facilitating electrical connections thereto.

References Cited

UNITED STATES PATENTS

| 1,751,424 | 3/1930 | Rosenthal | 310—58 |
| 2,494,200 | 1/1950 | Ramquist | 310—52 |
| 2,500,771 | 3/1950 | Wieseman | 310—58 |
| 2,720,679 | 10/1955 | Maltby | 318—313 |
| 3,154,730 | 10/1964 | Houldin | 318—313 |
| 3,231,807 | 1/1966 | Willis | 318—313 |
| 3,339,095 | 8/1967 | Schlabach | 310—66 |
| 3,383,530 | 5/1968 | Dunn | 310—52 |

J. D. MILLER, Primary Examiner

U.S. Cl. X.R.

310—58, 67, 68, 155; 318—313